Dec. 12, 1967  D. R. HUNT  3,358,075

SEALED ELECTRODE ASSEMBLY

Filed Sept. 23, 1965

INVENTOR
DONALD ROBERT HUNT

BY Young & Thompson

ATTORNEYS

United States Patent Office 3,358,075
Patented Dec. 12, 1967

3,358,075
SEALED ELECTRODE ASSEMBLY
Donald Robert Hunt, Stroud, England, assignor to George Kent (Stroud) Limited, Stroud, England
Filed Sept. 23, 1965, Ser. No. 489,606
Claims priority, application Great Britain, Sept. 24, 1964, 39,045/64
3 Claims. (Cl. 174—153)

This invention relates to electrode assemblies for mounting in the walls of tubes with an insulating lining in order to provide electrical contact with liquid flowing along the tubes. Such a tube is commonly used, for example, in the detector head of a electro-magnetic flowmeter or conductivity meter.

An assembly in accordance with the invention is particularly useful for a tube the insulating lining of which is provided by a material subject to cold flow, for example P.T.F.E. (Polytetrafluoroethylene). In the past considerable difficulties have been experienced in mounting electrodes in such tubes in a manner which provides a leak-tight joint, and this is particularly the case when the lining is P.T.F.E. as in the form employed this material cannot be bonded to the tube and is exceptionally prone to cold flow.

According to one feature of the invention an electrode assembly comprises an electrode with a screw-threaded shank and a head which provides an electrode surface and the underside of which has a projecting peripheral ridge adapted to seat into the tube lining, an insulating bush for the shank formed for mounting in a bore through the tube wall and with a smaller outer inner end diameter than that of the electrode head, and a clamping nut which can be tightened on the screw shank to draw the electrode into the bush to provide a seal between the electrode head and the lining.

Preferably the electrode has a domed head with the ridge sharply pointed so that it readily bites into the lining. It is also preferable that the outer diameter of the inner end of the bush should be less than the inner diameter of the electrode head ridge. The bush conveniently has an outer end flange which seats against the outer surface of the tube when fitted therein, the length of the section of the bush which fits within said bore being slightly longer than the tube wall thickness.

According to another feature of the invention an insulated tube and electrode assembly comprises a tube with an inner lining of an electrical insulating material, the tube wall having a radial bore of greater diameter than an aligned bore in the lining, an insulating bush fitted within the radial tube bore, an electrode having a shank passing through the bush and a head disposed within the tube, and a clamping nut threaded on the shank to draw the electrode into the bush so that the electrode seats in the inner surface of the lining, to this end the electrode head having a diameter somewhat greater than the diameter of the radial tube bore and being formed on its under surface with a projecting peripheral ridge.

When the lining is of thermoplastic material the tube with the lining is conveniently heated to a suitable temperature to soften the lining before the electrode is fitted.

The invention will now be further described with reference to the accompanying drawings which illustrate, by way of example, an electrically insulated tube and electrode assembly in accordance with the invention. In the drawings.

Figure 1:
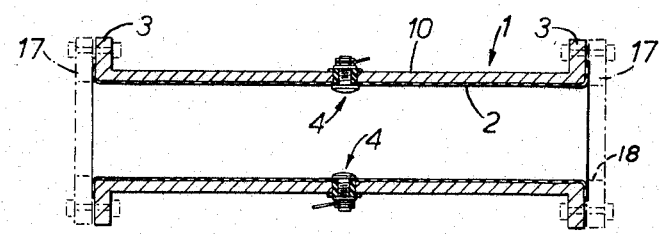
FIGURE 1 is an axial sectional view of the assembly.

The assembly forms the detector head of an electro-magnetic flowmeter and the tube 1 has an internal insulating lining 2 of P.T.F.E. which is not bonded in position but in service is held at the ends by means of the tube mounting flanges 3. Two diametrically opposed mushroom-headed electrodes 4 are mounted in the tube wall so that the convex domed surfaces 5 of electrodes are in electrical contact with liquid flowing along the tube.

Figure 2:
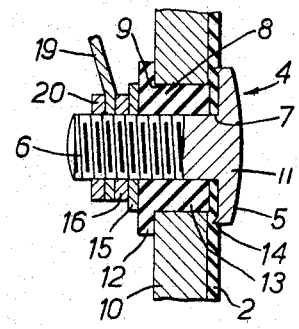
FIGURE 2 is a detail thereof to a larger scale.

Each electrode 4 (see particularly FIGURE 2) has a screw-threaded shank 6 which fits closely through a radial bore 7 in the lining and through a hard electrically insulating bush 8 which is a close fit in a radial bore 9 in the tube wall 10. The bore 9 is slightly less in diameter than the outer diameter of the electrode head 11. At its outer end the bush 8 has a flange 12 which engages the outer tube surface, and the section 13 of the bush 8 which fits within the tube wall 10 has a length slightly greater than the tube wall thickness. A sharply pointed peripheral ridge 14 projects from the rear surface of the electrode head 11 and has an internal diameter slightly greater than the outer diameter of the inner end of the bush 8. A washer 15 and clamping nut 16 are mounted on the shank 6 externally of the bush 8.

The electrode is assembled in the following manner. The ends of the lining 2 are first temporarily restrained by means of clamping rings (shown in broken lines at 17 in FIGURE 1) bolted to the tube flanges 3, the ring bores 18 providing access to the through bore of the lined tube 1. With the lining so restrained the tube with the lining is heated to a temperature of 300° F. and the electrodes 4 inserted in position through the lining 2 and tube wall 10 from within the tube. When an electrode 4 is so positioned the corresponding insulating bush 8 is fitted over the shank 6 and pressed fully home into the corresponding bore 9 against the outer tube surface, the washer 15 and clamping nut 16 then being fitted.

When the nut 16 is tightened the adjacent section of the lining material is forced against the under surface of the electrode head 11 within the projecting ridge 14 and the sharp edge of the ridge is pulled into the lining material. Thus a dual seal is effected; a knife-edge seal around the periphery of the electrode head 11 and a pressure seal between the inner end of the bush and under surface of the electrode head 11. An electrical connection with each electrode 4 is provided by a solder tag 19 fitted on the electrode shank 6 and held in position by a terminal nut 20 which also acts as a locking nut for the clamping nut 16.

I claim:
1. An insulated tube and electrode assembly comprising a tube wall having a radial bore, an inner lining of an electrical insulating cold-flowing thermoplastic material on said wall, the lining having a radial bore of less diameter than and aligned with the bore in the wall, a rigid insulating bush with an inner cylindrical portion adjoining an external flange portion, the inner portion fitting within the radial bore wall and being of a length greater than the wall thickness so that an inner end section of the bush projects at the inner side of the wall to seat into the lining and the flange portion engaging the outer surface of the tube to define the inner projection of the bush, an electrode having a shank and an inner end head for electrical contact with liquid flowing through the tube, the head having a pointed ridge disposed adjacent the periphery of the head and biting into the lining, with the shank passing through the bush and having a screw-threaded section projecting externally thereof, and a clamping nut on the threaded shank section which is tightened to clamp and grip the lining between the rigid bush and the electrode head to provide a double seal resulting from the deformation of the lining on one side by the inner end of the rigid bush and on the other side by the electrode ridge, said electrode ridge preventing the cold flow of the gripped lining portion from between the rigid bush and the electrode head.

2. An assembly as claimed in claim 1, said thermoplastic material being polytetrafluoroethylene.

3. An assembly as claimed in claim 1, said electrode ridge having an inner diameter slightly greater than the outer diameter of said inner portion of the bush.

References Cited

UNITED STATES PATENTS

| | | | |
|---|---|---|---|
| 2,666,805 | 1/1954 | Smith | 174—153 |
| 2,774,812 | 12/1956 | Clark | 174—153 |
| 2,949,551 | 8/1960 | Sturgeon | 73—194 |
| 3,094,000 | 6/1963 | Kass | 73—194 |
| 3,177,709 | 4/1965 | Fischer | 174—153 |

FOREIGN PATENTS 895,547   4/1944   France.

OTHER REFERENCES

Taylor, IBM Technical Disclosure Bulletin, vol. 4, No. 12, May 1962, page 7.

LARAMIE E. ASKIN, *Primary Examiner*.